Sept. 24, 1957     E. L. McLIN     2,807,157
HUB CAP LOCK
Filed March 1, 1956     2 Sheets-Sheet 1
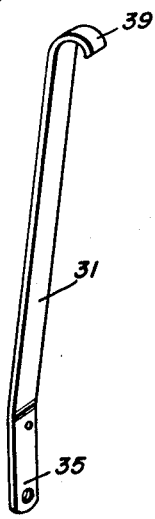
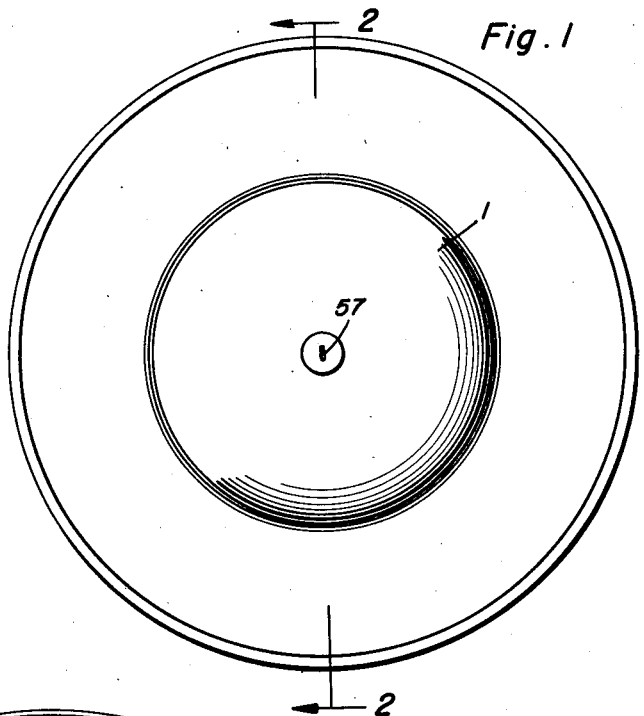
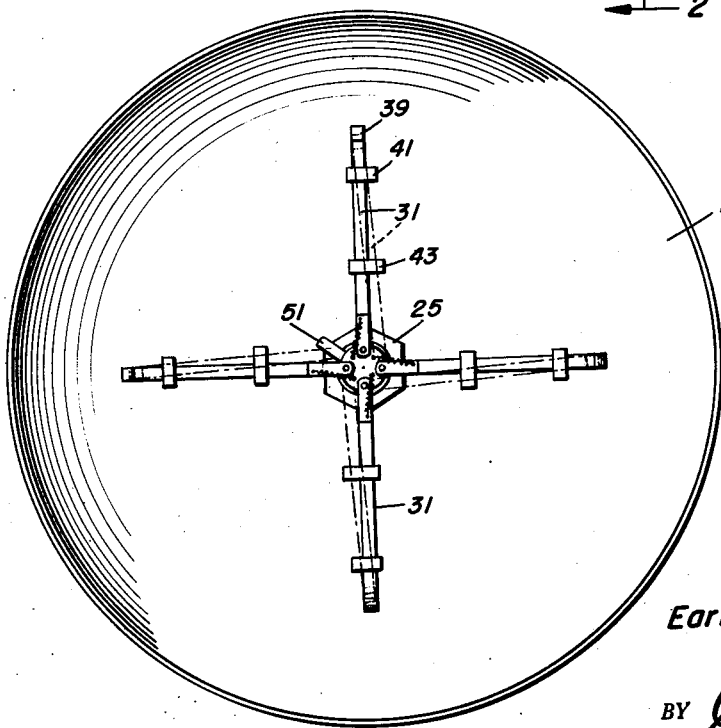
Earl L. McLin
INVENTOR.
BY *Clarence A. O'Brien*
*and Harvey B. Jacobson*
Attorneys Sept. 24, 1957     E. L. McLIN     2,807,157
HUB CAP LOCK
Filed March 1, 1956                                 2 Sheets-Sheet 2
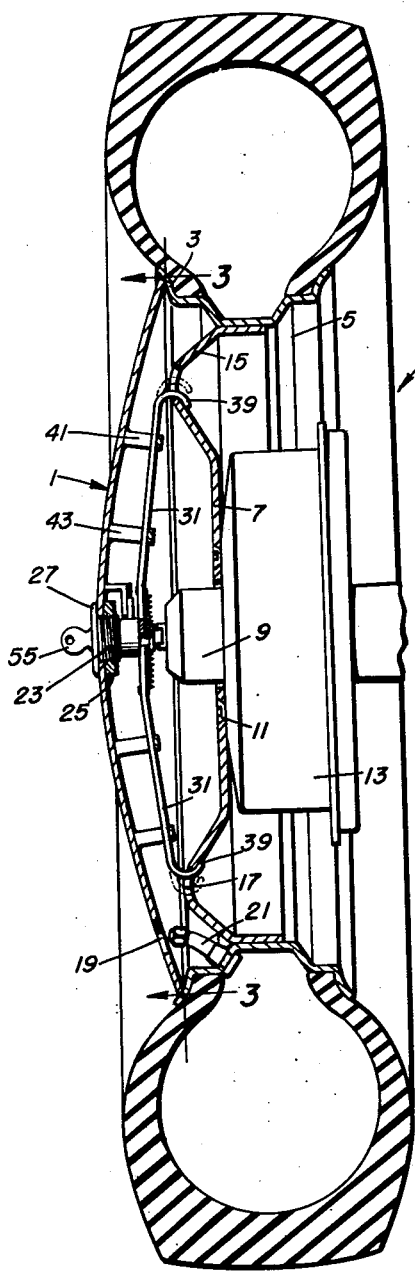
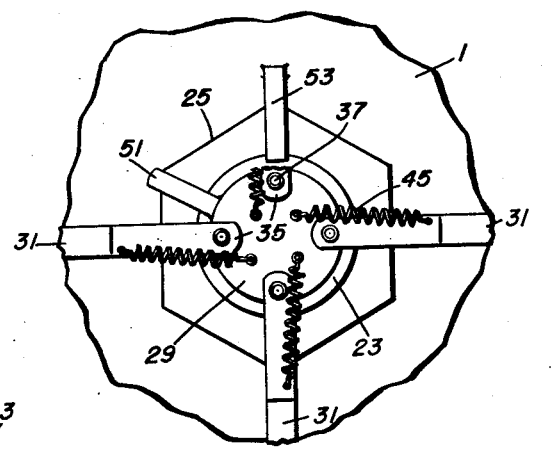
Earl L. McLin
INVENTOR.

United States Patent Office 2,807,157
Patented Sept. 24, 1957

2,807,157
HUB CAP LOCK
Earl L. McLin, Caryville, Tenn.
Application March 1, 1956, Serial No. 568,763
2 Claims. (Cl. 70—169)

My invention relates to improvements in locks for the hub caps of automobile disk wheels.

The primary object of my invention is to provide a lock for securing the hub caps of disk-type wheels easily and quickly to the conventional disk plate of such wheels without altering the disk or web plate, or adding parts thereto, and to prevent removal of the hub cap or wheel by unauthorized persons.

Another object is to provide locking means for the above purposes which can be easily and inexpensively incorporated in the hub cap for locking coaction with the usual holes in the disk plate of such wheels.

Still another object is to provide locking means in the hub cap which will not rattle and is not liable to get out of order and is substantially foolproof.

These together will other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation of a disk-type wheel having my improved hub cap lock applied thereto;

Figure 2 is an enlarged view in vertical transverse section taken on the line 2—2 of Figure 1;

Figure 3 is an enlarged view in rear elevation of the hub cap detached and showing the locking means incorporated therewith in unlocking position;

Figure 4 is a further enlarged fragmentary view in rear elevation of the same;

Figure 5 is an enlarged fragmentary view similar to Figure 4 but showing the locking means in the hub cap in locking position;

Figure 6 is a view in horizontal section taken on the line 6—6 of Figure 5; and, Figure 7 is an enlarged view in perspective, of one of a series of clamping bars forming part of the locking means in the hub cap.

Referring by numerals to the preferred embodiment of my invention illustrated therein, 1 designates the conventional dished hub cap of a well known type of disk wheel, the cap fitting against the outboard flange 3 of the tire supporting rim 5 and covering and spaced outwardly of the usual disk or web plate 7 and hub 9 extending out of said plate 7 which is secured, as at 11, to the front side of the brake drum 13. The disk plate 7 is formed with an outwardly bowed circumferential, hollow edge bead 15 which is formed with holes 17 therein arranged in 90° angular relation in diametrically opposite pairs for attachment to the wheel of wheel pullers or chains, both not shown. The numeral 19 designates the usual access hole in the hub cap 1 to the tire valve 21.

According to my invention, the hub cap 1 is provided with an axial bushing 23 threaded therethrough and retained in place by a jamb nut 25 threaded on the bushing 23 against the inner face of said hub cap 1.

A rotary cylindrical operating member 29 for a series of locking bars 31 is journaled through the bushing 23 with a circumferential outer end flange 27 bearing against the outer face of the hub cap 1.

There are four locking bars 31 in the series, corresponding to the number of holes 17 and said bars radiate from the inner end 33 of the operating member 29 and are pivoted at inner ends 35 thereof by pivot studs 37 to the inner end 33 of said member 29 in 90° angular relation for projection and retraction by rotation of said operating member 29 in opposite directions, respectively. Hooks 39 are provided on the outer ends of said bars 31 for hooking into the holes 17 to lock said hub cap 1 to the web plate 7.

Pairs of guide loops 41, 43 on said hub cap 1 adjacent the outer and inner ends of the locking bars 31 and in which said bars slide and fulcrum hold said bars 31 in radial position relative to said member 29 when the bars 31 are projected as shown in Figure 3 in full lines and in Fig. 4 and hold said bars 31 in tangential position relative to said member 29 when said bars 31 are retracted as best shown in Fig. 5. Also, the guide loops 41, 43 engage the bars 31 and limit rotation of the operating member 29 in one direction when said bars 31 are projected.

Coil springs 45 extending diagonally from the locking bars 31 to the inner end 33 of the operating member 29 with ends connected to said bars 31 and end 33 as at 47, 49 tend to hold said bars 31 in retracted position and against vibration.

A radial cam arm 51 on said member 29 engages a similar arm 53 in the hub cap 1 with a wedging action and frictionally locks the operating member 29 against rotation in a direction to project the locking arms 31 when said arms 31 are retracted.

A key 55 insertable in a longitudinal key slot 57 in the operating member 29 provides means for rotating said member. As will be understood, the locking bars 31, the inner end of the locking member 29 and the guide loops 41, 43 are behind and within the hub cap 1.

The operation of my invention will be readily understood. The locking bars 31 are projected by rotation of the operating member 29 counterclockwise, as viewed in Figures 3, 4, and 5. When said bars 31 are projected the hooks 39 are arranged in a circle so that when the hub cap 1 is applied with the access hole 19 in opposite registration with the valve 21 said hooks and said hub cap forced against the rim flange 3 said hooks 19 will be inserted into the holes 17. Then the operating member 29 is rotated clockwise, as viewed, in Figures 3, 4 and 5, to retract the locking bars 31. Retraction of said bars 31 from projected position will engage the hooks with the web plate 7 behind the holes 17 and lock said cap in place, as shown in Figure 2. At this point the arms 51, 53 are frictionally interlocked to frictionally retain the hub cap 1 locked and the springs 45 act to yieldingly retain the hooks against vibrating in the holes 17. The manner in which the hub cap 1 is unlocked will be clear without explanation. The key 55 provides for operation of the lock by authorized persons only and together with the key slot 57 may be suitably designed so as to make operation of the lock substantially impossible without the key.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:
1. A hub cap lock for a dished hub cap fitting when applied against a rim of a disk wheel having circumferentially spaced holes in the edge of the disk, said cap having an access opening therein for registration with a tire valve on a rim of the wheel, said lock comprising an axial bushing threaded through the hub cap, a rotatable cylinder extending through said bushing and having an inner end in said cap, a series of locking bars in said cap radiating from the inner end of the cylinder and having inner ends pivoted to said inner end for projection and retraction of said bars in response to rotation of said cylinder in opposite directions, said bars having hooks thereon disposed opposite said holes when the bars are projected and said access opening registers with said valve, said hooks being insertable through said holes by applying the disk to the rim and hooking into said holes in response to retraction of the bars, bar guiding means on said cap through which said bars slide during advance and retraction of said bars, manipulative means for rotating said cylinder, and friction locking cam arms on said cap and cylinder interengaging when said bars are retracted to prevent rotation of the cylinder in a direction to project said arms.

2. A hub cap lock according to claim 1, and tension springs extending diagonally from said bars and connected thereto and to said inner end of the cylinder to prevent vibration of said bars when retracted.

References Cited in the file of this patent

UNITED STATES PATENTS

| | | |
|---|---|---|
| 1,006,944 | Holdridge | Oct. 24, 1911 |
| 1,433,515 | Berthold | Oct. 24, 1922 |
| 1,879,359 | Linfert | Sept. 27, 1932 |
| 2,012,735 | Swatz | Aug. 27, 1935 |
| 2,363,567 | Blakeman | Nov. 28, 1944 |